Patented May 4, 1937

2,079,313

UNITED STATES PATENT OFFICE 2,079,313

METHOD FOR MAKING ALKALI-CELLULOSE AND PRODUCTS THEREFROM

Paul D. Clary and Franklin T. Georgeson, Eureka, Calif.

No Drawing. Application October 31, 1933, Serial No. 696,116

3 Claims. (Cl. 260—10)

This invention relates to processes of manufacturing alkali-cellulose and products therefrom, and more particularly to processes of preparing alkali cellulose from which cellulose esters and ethers for the manufacture of artificial threads, films and the like, may be prepared.

At present, alkali cellulose is usually prepared by immersing cellulose, which may be in any form suitable to enter into the reaction, such as wood pulp, cotton-linters, alpha fibers or otherwise, in a solution of sodium hydroxide of a strength within a mercerizing range, i. e., from 17 to 18%. According to some authorities, the usual commercial flow sheet using an initial amount of 100 kg. of cellulose pulp calls for steeping such a charge with about 1920 kg. of the hydroxide solution. After steeping for the necessary period, the excess soda is pressed out under a high degree of hydraulic pressure, leaving in addition to the starting charge of 100 kg. of cellulose, about 225 kg. of caustic soda and water. After maturing and ripening which takes considerable time and is usually done in closed containers, the time being dependent upon the degree of viscosity desired in the finished product, a material is obtained known as alkali cellulose. This alkali cellulose is treated with carbon disulphide whereupon it emerges as a xanthate, and thereafter by suitable treatment involving dilution, it becomes a cellulose ester such as viscose. Or the alkali cellulose may be treated under the proper conditions with alcohol or phenols, the reaction in such case involving complete or partial replacement of the hydrogen atoms of the hydroxyl groups by similar or dissimilar alkyl or aryl radicals to form cellulose ethers. For instance, ethyl cellulose may be prepared by the action of ethyl chloride under pressure upon alkali cellulose; or by the action of diethyl sulphate upon alkali cellulose, a like reaction occurring without the need of increased pressure. The typical processes above noted, as far as the preparation of alkali cellulose is concerned, not only involve a large volume of sodium hydroxide solution, but also involve the expressing of a major portion of the same when the excess material is removed, the excess material being an industrial problem and constituting economic waste. For instance, it will be observed in the above example, 1920 kg. of 17.5% caustic soda was used which involves 336 kg. of solid soda, and that after pressing out excess, all but approximately 45.70 kg. of solid soda had been removed, the difference being 290.30 kg. of waste or contaminated soda. In English measure, this amounts to 638.66 pounds, and as the finished lot of viscose is approximately one ton in weight, the waste soda ratio may be predicated upon a ton of product as a basis.

The use of extra quantities of caustic soda as described above, has hitherto been deemed necessary in the preparation of viscose because of the exothermic action characteristic of the relatively large size of the individual industrial batch established at the outset of the industry, and because it was then considered essential to purify the cellulose used as a raw starting material. By using such an excess of caustic, these two steps were combined in one operation, i. e., purification of the product and "drowning" or absorbing of the exothermic heat by an excess of solution. The impurities present in the first viscose were a matter of considerable importance and even as late as 1928, it was considered that a product containing approximately 79% alpha cellulose, with 12 to 13% beta and gamma cellulose and the remainder ash, resin and minor impurities was satisfactory for the viscose reaction. The removal of the excess liquor was therefore considered essential so as to take out the maor portion of the hydroxide-soluble beta and gamma material, which was of no value for the process. At the present time, pulps may be obtained which possess 90%, 95% and even 98.5% alpha cellulose content with a corresponding reduction of secondary undesirable constituents.

In industrial operations as an economical step, the liquor drained off from the pulp before actual pressing is started is conditioned to be used over again by "bolstering" or strengthening with fresh caustic. This solution carries small amounts of dissolved celluloses and impurities extracted from the pulp, which are therefore always present in the steeping liquor when it comes in contact with the pulp, with the exception of the initial dose of steeping solution. The larger the ratio of liquor to pulp, the smaller the rate of building up of the impurities, and accordingly a further advantage of the excess of caustic is indicated. Obviously the caustic quickly reaches such an impure condition as to require a new charge for ensuing batches of products.

The second purpose of the excess of caustic solution was to force out the entrapped air and to "drown" or absorb the exothermic heat by the excess of solution. Were it not for this excess, the actual mass of the commercial batch of alkali cellulose as prepared by the present methods is relatively so great that the material at the center of the mass is located so far from the exterior radiating surface that it may rise in temperature beyond the danger point, even though the substance adjacent to the exterior surface has not reached an equal point owing to surface radiation. A drastic reduction of solution will permit the internal mass to reach and pass safe limits while the superficial surface is unharmed. While the presence of an excess caustic soda solution has taken care of the temperature rise sufficient to keep it within safe limits, it has not been so far possible to establish uniform conditions through a batch of cellulose and to accurately control the reacting conditions therein.

In overcoming disadvantages of the prior art processes as pointed out above, our invention has among its major objects, the provision of a process in which the chemical "net", or approximately the amount of reagents desired to enter into the reaction are employed, and no excess of reagents are required which involve additional expense in pressing, and, when they are not entirely wasted, must be recovered by expensive processes. Obviously it is necessary to use more alkali metal hydroxide solution for the alkali-cellulose reaction than is indicated by the exact chemical formula because if the true chemical net alone is used, the water of solution will quickly set up a harmful reaction and break down the alkali-cellulose. For instance, according to the chemical formula, 100 grams of thoroughly dry chemically pure cellulose requires 24.7 grams of sodium hydroxide which corresponds to 137.1 grams of an 18% caustic soda solution. In order to prevent water from decomposing the alkali cellulose during maturing and aging, however, an excess of caustic soda solution must be used. Furthermore, about 13–16% of the soda is taken out of the solution by adsorption by the fibers. This adsorption reduces the concentration of the remaining solution with a corresponding increase in the percentage of water; and without excess to compensate for this condition, the alkali-cellulose tends to break down during storage. It is evident therefore that the chemical "net" herein described constitutes what might be termed a semi-stabilizing net sufficient to produce an alkali-cellulose by the mercerizing action and not the theoretical chemical net. The term stable is not entirely proper since the alkali cellulose is not really stable at any time by reason of its undergoing continuous alteration.

A further object of our invention is the provision of a novel process of preparing alkali cellulose which may be used in the formation of viscose wherein the conditions of reaction may be accurately controlled, and the necessity for an excess of reagents eliminated.

Still a further object of our invention is the provision of a novel process of preparing alkali cellulose whereby uniform products may be obtained through a continuously operating process, subject to automatic control and characterized by substantially exact chemical uniformity hitherto impossible to obtain under prior processes involving steeping and pressing.

Our invention has among its other objects a process wherein smaller batches of material other than those of former plant batch proportions are processed automatically and continuously whereby the heat evolved is easily controlled and a continuous uniform product is obtained.

A further object of our invention is the provision of a novel process of preparing alkali cellulose wherein the cellulose may be prepared with marked savings of reagents in such a manner that it may be aged and matured under proper conditions as long as desired so as to obtain the desired conditions suitable for further treatment necessary to produce thread, film or the like.

Still a further object of our invention is the provision of a novel process of preparing alkali cellulose whereby the cellulose may be subjected to a preliminary or intermediate purifying treatment prior to aging, as desired, and the product, after such purification, may be further processed in a manner closely approximating the process originally established.

Still a further object of our invention is the provision of a novel process of preparing alkali cellulose wherein the sodium hydroxide content, established as solid soda, may be kept at a limit if desired, thus permitting wide variations in the control of viscosity by means of selected control methods.

A further object of our invention is the provision of a process for preparing alkali cellulose whereby a material saving in sodium hydroxide is accomplished, there being substantially no waste of this reagent except that which may be optionally discarded under such purification methods as may be employed if desired.

Our invention further contemplates the provision of a novel process for preparing alkali cellulose which involves the use of a minimum of sodium hydroxide, as required for the reaction, and no removal of excess materials is involved, the minimum amount being established by each individual operator in accordance with the specific requirements of the situation based upon the product desired and the raw materials utilized, the entire operation being carried out at temperatures normally employed by the industry and preferably at normal or sub-normal atmospheric pressures.

In practicing the processes of our invention, we preferably employ a sulphite pulp material or sheets of cotton linters or other cellulosic material and reduce it to a finely divided state or condition approximating an open "cotton-like" material, although it is to be understood that the invention is not restricted to the use of cellulosic material of these classes or in any specific state or condition. Pulp in such a finely divided condition, in which the individual fibers may or may not be reduced in actual size, is particularly desirable in such work as a very small quantity of sodium hydroxide solution is required, in view of the increased area of the exposed surfaces of the fibers which assists in taking up the solution. Raw pulp material may be satisfactorily reduced to a finely divided cotton-like fuzz by use of a rapidly rotating steel-wire wheel. In the fuzzed condition, cellulose has been treated with an alkali metal hydroxide solution with uniformly successful results.

Obviously any number of methods for disintegrating the pulp aside from the wire wheel method may be employed such as ball-mills, grinders or other means. If it is not desired to prepare the material for use in the form of fluff or fuzz, it may be placed in its undivided state in a mixer, kneader, rod-mill, shredder, shaker, or similar device, and when the quantity of sodium hydroxide is sufficient for the purpose, the two materials may be intimately worked together without difficulty, the pulp evidencing a natural tendency to reduce to the shredded state upon the application of moisture. Where the quantity of alkali hydroxide solution used is less than that sufficient to obtain satisfactory results by the simultaneous alkalization and shredding, the material in its finely divided condition is preferably used. Cotton-like pulp is placed in a closed container with the required amount of alkali metal hydroxide solution and by means of a stamping device of approved form, such as that possessing a vacuum cup at the end of a substantial shaft, with side plates for mixing the material in a general manner, the mass of pulp together with the alkali solution is mixed, stirred and worked and the solution is thus drawn and kneaded throughout the mass, a homogenized material being obtained. Means for creating a partial vacuum upon the contents of the mixing vessel is preferably employed as elimination of oxidizing action upon the cellulosic material during the reaction is desirable.

By means of a step such as above described, we have found it possible to prepare an alkali cellulose without adding substantially any more water or chemical constituents than is required by the proportions of the chemical reaction, and have been enabled to knead into the cellulosic material the minimum amount of sodium hydroxide solution required for the manufacture of alkali cellulose.

A further preferred method of carrying out the above step in our novel process involves the use of a continuous centrifuge. Such a machine is designed to provide means whereby a continuous flow of material therethrough can be assured and controlled, and is provided with a thermostatic control preferably mounted within the centrifuge basket, set for such temperature variations as may be desired. The exterior surface of the rotating basket, which is preferably formed of non-corrosive material, may be provided with slight projecting fins having the function of increasing radiating area, and positioned in alternate opposed angles slightly out of parallel with the track at a point upon the surface so as to eliminate basket vibration which might otherwise be set up. The number and design of the fins or radiating ribs is to be determined by the heat transfer requirements indicated. The space immediately surrounding the rotating basket is enclosed in an air-tight manner, the size of the enclosed area likewise depending upon the quantity of heat to be handled. In such a construction, the whirling action of the basket creates a "pump action" within its enclosure. The enclosure is provided with an inlet and an outlet opening which openings are preferably equipped with automatic louver controls on the order of winter-front arrangements utilized on automobile radiators in cold climates. The opening and closing of the louvers is positively controlled by means of a thermostat within the basket.

In order to overcome any possibility of an undesirable oxidizing action due to the action of the centrifuge running at high speed and creating a pump action, precautions are preferably taken at the feed and discharge points to prevent the excess ingress of air, and an additional vacuum may be created within the centrifuge basket if desired. For instance, the solid pulp sheets in a continuous stream composed of several sheets nested vertically may be introduced through feed rolls against a fuzzing mechanism, or the previously finely divided pulp material may be fed in a constant stream, the divided material falling to the bottom of a cone-shaped collector feeding directly to the centrifugal basket. Since the general assembly is preferably housed in an air tight casing, a strong vacuum may be provided immediately outside of the force feed rolls or other mechanism thus materially decreasing the volume of air admitted to the basket. Other means may be employed to create an additional vacuum within the basket and to reduce the areas affected by minor air currents. A minimum period of travel of the material through the basket may be utilized to reduce the oxidizing period to a minimum, the finished material being preferably confined at once within approved air tight containers. If excess air entrapped within the container is considered undesirable, it may be quickly evacuated by means of a vacuum applied thereto for a short interval, a simple one-way valve mechanism being preferably attached to the container thus avoiding any oxidizing action which may be set up during the period of aging within the container.

Other mediums than air may be used for the purposes of cooling. For instance, fluid conduits for cooling liquids such as water, or gases such as ammonia may be provided adjacent the basket, the flow of fluid therethrough being controlled by a thermostat as above noted.

While such machines as described above are designed primarily for the purposes of extracting excess moisture from products and are not used for impregnating purposes, it is desired in the present instance to utilize the device for impregnating purposes rather than for separation work. In the preferred manner, the soda solution is introduced from a hollow central axis under constant pressure whereby the volume may be controlled as a fine, equally distributed spray. Other means may be employed such as a hollow encircling pipe on the order of a needle spray suspended within the centrifuge or spinning flat disks may be affixed to a central axis in planes substantially at right angles to the axis whereby the solution when fed onto the spinning disks will be thrown off with considerable centrifugal force aiding in its impregnation of the material in a uniform manner, and at definite plane or plane locations as may be desired. Or a spiral member comprising a screw positioned on a central axis and rotated at a predetermined speed may be employed to distribute the solution over the entire interior of the centrifuge or only a portion thereof. At the same time finely divided cellulosic pulp is introduced, the latter being immediately thrown to the interior surface of the revolving basket and forming as a soft blanket into which the predetermined amount of alkali solution is forced by centrifugal force. This force may be for example, 500 times gravity, resulting in a tremendous pressure more than the equivalent of the 400–500 pounds pressure which is the average force utilized by the hydraulic pressure method now employed. As the pressure may be readily increased within wide limits, it is evident that the finely divided cellulosic fibers will be given a drastic intimate impregnating contact with the sodium hydroxide solution, within an exceedingly brief interval of time. Since the basket is so designed as to provide control of "travel time" of the material therethrough, it is obvious that it will under constant feed produce a constant volume of impregnated alkali cellulose in uniform quality and in condition to be stored. The capacity of the basket is sufficiently small so that the heat generated by the exothermic reaction is not of an amount greater than can be handled by the cooling system.

If desired, a machine of the above type may be modified as for batch operation to provide a shape similar to that of two funnels or cones joined together at their wide ends to form a single container. Such a machine may be employed to act as a mixer, mill or beating machine, or may be adapted to become a centrifugal drier when desired. Suitable mechanism may be employed to enable the container to be turned up to an angle of 90 degrees so that when the major axis of the double cone container assumes a vertical position, the container may be rapidly rotated at high speed similar to the action of a typical high-speed centrifugal extractor. Suitable openings may be provided capable of being closed or opened at will in the line of greatest diameter where the two cones join, and provided with screens such that balls (if used as a grinding or mixing device) may be prevented from escaping, and by proper construction also prevented from blocking the openings through which the excess portions may be thrown off and caught, if desired, in a suitable receptacle for further utilization if desired. Means may also be provided for piping arrangements so that water for cleaning or other purposes may be introduced, measured reservoirs being preferably provided for the introduction and measurement of all reagents.

Containers as employed in a machine of the above type may be made separate units, so that after treatment of the charge they may be carried away on carriers and be stored in proper spaces under the desired conditions of temperature and humidity. To assist in thorough homogenization of the material during storage, the containers may be rotated or violently shaken by suitable vibratory means or the contents agitated or stirred in an approved manner so as to thoroughly equalize or homogenize the aging alkali-cellulose. Such a method assures an accurate and easy control of the reaction at all times and insures the preparation of a uniform product. While the foregoing step in our process has been described in connection only with the addition of sodium hydroxide solution, it is to be understood that the material may be pulped in the mixing apparatus using water only to attain the desired uniformity of moisture content. When only water is used, it must be introduced in less amount than the final desired water content of the described commercial strength of solution, and a concentrated solution of sodium hydroxide may be added to the water content in intermediate doses or as desired so as to produce the final total amount of sodium hydroxide and water desired. In this respect, it might be possible to introduce solid sodium hydroxide if precautions are taken to combat the spontaneous generation of heat incidental thereto. Vacuum, hydraulic pressure or the like may be employed to produce a homogenized mass, and it is to be understood that we do not limit ourselves in any respect to the foregoing methods to obtain the desired homogenized final products, any further approved methods being considered to be within the scope of our invention.

It is to be noted that as the combination of sodium hydroxide with the cellulose sets up an exothermic reaction causing a distinct rise of temperature in the mass, no matter in which way it may be mixed, which temperature varies with the concentration of the sodium hydroxide in the mass of cellulose, temperature control during alkalization of the cellulose becomes an important factor. Such control is preferably accomplished in our invention by treatment of relatively small masses of cellulose, thus making heat control an easily handled problem, rather than the more difficult task entailed in handling large unit masses, which as discussed above, requires the use of large excesses of sodium hydroxide solution in order to "drown" the heat, and accordingly involves a large waste of material.

After the cellulosic material has been thoroughly treated, and the desired homogenized mass obtained, the material may be shredded, or separated in any approved manner as desired, placed in storage under desired conditions and permitted to ripen or mature to such a point as is desired in the final product. The alkali cellulose may be shredded in the original container and permitted to mature therein if desired or the container may be made removable from the mixing apparatus for storage purposes as pointed out above. Any approved storage or shredding methods applicable to alkali cellulose may be considered within the scope of our invention insofar as their employment is indicated.

While cellulosic material of a high degree of purity is preferred as a raw material, it is to be understood that material of less purified nature may be utilized. In such a case, such relatively impure material may be subjected to a purifying operation before aging of any nature such as impregnation with a solution of sodium hydroxide to such a degree of moisture content above the minimum as may be desired. Excess liquid, together with soluble material contained therein may be expressed by a hydraulic pressure or otherwise, and the process heretofore outlined concluded, due allowance being made for the actual sodium hydroxide and water content remaining in the original starting material, exclusion of air being maintained through the process if desired.

A purification process utilizing a small or optional excess of full mercerization strength of sodium hydroxide solution may likewise be employed without materially deviating from the basic savings inherent in the process herein disclosed, and the desired fundamental savings of caustic soda solution may be accomplished in this manner, the major volume of caustic soda as required for the steeping-pressing operation not being required. If the purification process employed results in or produces a cellulosic product which contains by-products requiring neutralization or other additional treatment during the alkali-cellulose formation or later dilution or dissolving, any required treatment by materials soluble in the mass or by aging or maturing methods may be employed.

After maturing and ripening of the alkali cellulose which takes considerable time in closed sealed containers, dependent upon the viscosity desired in the finished product, the so called mercerizing and maturing action is considered complete, and the material is ready for treatment with a sulphidizing agent such as carbon disulphide. The alkali cellulose upon treatment with the carbon disulphide is xanthated and thereafter by suitable treatment involving dilution, becomes a finished viscose.

According to the treatment given alkali cellulose either in the formation of the same or in subsequent treatment during xanthation and dilution, solutions of the final viscose products can be obtained ranging from 5 to 20% of cellulose and yet possessing the same viscosity. Control of viscosity may be effected by varying the sodium hydroxide or water content in the alkali cellulose as well as by varying the time and conditions of storage, and may also be effected by varying the amount of sodium hydroxide or water added during the later dilution period, no sodium hydroxide being added if sufficient for the purpose is already contained in the alkali cellulose material. Control of viscosity by other agents and methods aside from those enumerated may be optionally employed. Agencies or methods designed to control ripening, storage and keeping qualities that effect other characteristics of the material may be used without effecting the basic methods of our invention. While control of viscosity may also be effected by varying the treatment with the sulphidizing agent in the course of the necessary procedure, this control may be considered as apart from those above outlined, and any such additional control by means of sulphidizing agents which may be required in any specific case may be optionally employed in conjunction with the methods indicated for sodium hydroxide and water control.

It is to be noted that cellulosic material may be treated by means of methods herein outlined with a minimum or desirably low amount of sodium hydroxide solution of a strength as defined within the mercerizing range necessary to produce reaction in the desired form, the total amount of solution added being limited in minimum quantity only by the efficiency of the equipment with which the sodium hydroxide solution is placed into intimate contact with the cellulosic material, in conjunction with the inherent ability of the cellulosic material to combine with the amount of actual sodium hydroxide which it is able to take up. The conditions for mercerization ordinarily considered manufacturing conditions are such that an 18–25% solution of sodium hydroxide (25–30 degrees Baumé) is used at a temperature of 15–20 degrees C. Chemical authorities state that "given sufficiently intimate contact mercerization appears to be complete in about three minutes. It is stated to be instantaneous and that immersion for a period longer than one minute is useless." A temperature of 20 degrees C. must not be greatly exceeded since hot solutions do not produce mercerization effects. The alkali may be even stronger than a 25% solution without causing a marked difference in the final effect, and it may be used at less than 18% under proper conditions and still produce a mercerizing effect. Means for control of temperature of the contents of the mixing apparatus are thus indicated as desirable.

Standard alkali cellulose as prepared under average commercial conditions may be said to contain approximately 27 to 31% cellulose, 13.7 to 16% sodium hydroxide and the remainder water. The following examples illustrate our process as applied to the manufacture of alkali cellulose of substantially standard characteristics. Obviously, it may be varied in the same general manner and to the same general limits that present commercial methods may be varied to meet any standard or special flow sheet practice demanded. With different grades of cellulose, it is quite often necessary to change details to obtain desired results.

Example No. 1

100 grams of 98.5% alpha cellulose, cotton linters or sheeted pulp is used as a starting material, containing 7 grams of moisture, to which is added a solution containing 47.70 grams hydroxide and 170.30 grams of water or a total of 218 grams of solution, which when the moisture content above noted is taken into consideration becomes the equivalent of 225 grams of 21.20% sodium hydroxide solution. The mass is mixed and thoroughly homogenized in the manner and procedure hereinbefore noted at normal customary described manufacturing temperatures, producing an alkali cellulose containing 15% sodium hydroxide, 29.2% total cellulose and 55.76% water, the alpha cellulose content being approximately 28.8%. If sulphidized in such a manner that 30 grams of carbon disulphide has been retained in the xanthate, 827 grams of 3.5% sodium hydroxide solution containing 28.94 grams of sodium hydroxide is added for dilution, and 1175 grams of viscose is obtained which contains 6.52% free and combined sodium hydroxide and 7.79% cellulose based upon the alpha cellulose content.

Varying the amount of sodium hydroxide in the alkali cellulose may be accomplished as desired, care being taken to use such concentrations of sodium hydroxide as are within the limits of mercerizing action, so that an alkali cellulose will be obtained, while at the same time the ratio of water content to sodium hydroxide does not pass the safe limits normally recognized as harmful. Varying the amount of concentration of sodium hydroxide solution in the diution or dissolving period may be optionally accomplished to obtain the product desired, any type of solution ranging from water possessing no sodium hydroxide to any degree of sodium hydroxide content may be employed.

The variations in viscosity desired in the finished product are obtained by control of various items such as sodium hydroxide content of the alkali cellulose, as well as water and cellulose content, together with items of treatment in handling such as aging, maturing, temperature controls, and other details constituting standard practice. Sulphidizing control, as previously noted, will also affect the final viscosity and tend to vary the finished product, and in practice, both methods of control may be employed to some extent.

We prefer to use the major portion of our permissible soda content in the preliminary stage. By reason of this use of soda we have been able to use a correspondingly additional amount of water so that the wetting or commingling problem at this stage can be satisfactorily handled. In this manner the amount of water for the purpose of wetting the pulp may be run up while the concentration of this solution is still within the mercerization range. The amount of water in such a quantity permits thorough kneading, saturation and commingling with the cellulose mass while at the same time the soda content is sufficiently high to give the requisite chemical "kick" to the solution, and the process known as mercerizing takes place. The dilution solution may carry almost no soda at all, being practically clear water, or it may carry considerable in accordance with the limits hereinbefore set up.

Example No. 2

100 grams of 95% alpha sulphite cellulose is used as raw material and contains 6.3 grams of moisture content to which is added a solution containing 47.80 grams sodium hydroxide, and 170.90 grams of water or a total of 218.70 grams of solution, which when the moisture content above noted is taken into consideration becomes the equivalent of 225 grams of 21.24% sodium hydroxide solution. The mass is thoroughly homogenized in the manner and procedure hereinbefore noted at normal and customary prescribed manufacturing temperatures, resulting in alkali cellulose containing 15% sodium hydroxide, 29.4% total cellulose and 55.6% water, the alpha cellulose content being approximately 27.93%. If sulphidized in such a manner that 30 grams of carbon disulphide has been retained in the xanthate, 726.3 grams of 3% sodium hydroxide solution containing approximately 21.78 grams of sodium hydroxide is added for dilution or dissolving purposes, and 1075 grams of viscose is obtained which contains 6.47% free and combined sodium hydroxide, and 8.28% cellulose based upon the alpha cellulose content. In the cited amount of chemicals noted, variations may occur owing to impurities present and other considerations. Therefore all such weights and measurements are to be considered as close approximations within reasonable and allowable limits.

The percentage of undesirable materials within the mass of alkali-cellulose as obtained when suitable high alpha cellulose content raw starting materials are employed as above outlined, is well within the tolerable limits as defined by the industry. While the examples noted include suitable high alpha content starting material, it is evident that any material of somewhat lower alpha content and higher percentage of undesirable materials may be employed if desired. If the larger amount of beta, gamma and other materials or impurities present in a lower grade of starting material may be considered inimical to the finished product, the lower grade materials may be subjected to any acceptable preliminary cleansing treatment which does not prevent their utilization for alkali cellulose formation of any degree and nature as may be desired. The material is then subjected to the process herein outlined. If, on account of such preliminary cleansing treatment it may be found necessary to modify the proportions employed under the process herein contemplated, or introduce essential balancing chemicals so as to attain the desired product, such modification may be sensibly attained by following the methods as outlined herein, and such chemical balancing materials as may be required, may be introduced together with the alkali-cellulose formation materials herein employed, to attain the desired result.

It will be noted that the present process may entirely eliminate the necessity of re-using sodium hydroxide solution (yellow lye) which as now used, involves fortification and in some cases purification to some extent. With such reutilization of waste liquor as practiced in the past processes, it is obviously impossible to make the last batch of product of the same degree of purity or uniformity as the first batch which has been run off with entirely fresh hydroxide solution. It is also to be noted that while a substantial saving in hydroxide is accomplished with the use of relatively pure materials, i. e., approximately 650 pounds of hydroxide to a ton of viscose, relatively impure materials may also be utilized with the process by employing a purification process utilizing a small or optional excess of less than or full mercerization strength of sodium hydroxide solution, such an excess being relatively insignificant in comparison with the basic saving inherent in the process of the present invention.

With the savings as indicated above, it is evident that there is a considerable margin of caustic soda saving within which operations may be carried out, and preferably a balance is struck between the amount of caustic soda that can be wasted, if in consideration of the waste, a better product is obtained. Moreover, with the use of the excess amount of caustic soda, elimination of beta and gamma solubles may be obtained. This can be done (assuming the centrifuge to be elected as the desired mechanism) by treating the finely divided fibres in the centrifuge with approximately fifty percent more of the caustic soda solution than noted in the foregoing examples. The material, governed in its time in the centrifuge, would by this method be separated at the outlet into, first; a liquid effluent comprising waste caustic soda solution containing soluble beta and gamma impurities, and second; the required product of alkali-cellulose holding its percentage of moisture content as desired.

A sound purification method employed in conjunction with a continuous centrifuge, may employ for example, fifty percent more than the mercerizing amount of caustic soda solution cited in Example No. 1, together with the requisite amount of water to make the total solution of the strength indicated. This charge may be placed, together with the starting material, in the centrifuge and the time therethrough predetermined so as to permit the excess soda solution to thoroughly charge the mass and also dissolve the beta and gamma material present, discharging the liquid with its undesired suspended or soluble matter as a waste item, and permitting the fiber material to pass out, permitting, however, the predetermined amount of caustic soda solution to remain in the alkali-cellulose product thus obtained.

Actual waste under this particular example would therefore be approximately 23.85 grams of sodium hydroxide, as compared to a waste of approximately 290.30 grams under flow sheet quoted as an example of commercial practice. This amounts roughly to a saving of approximately 586.19 pounds of soda per ton of viscose produced. Obviously the flexibility of such a system is desirable since it will permit the individual operator to cleanse his alkali-cellulose to any degree which he may desire and the increase or diminution of the amount of excess caustic soda will be determined by the operator himself.

With the savings obtained by our process, it is apparent that an operator can be permitted to waste considerably more soda than is above outlined and still effect a very material reduction cost. This net saving, being determined by the operator in accordance with the use to which his specific viscose may be put, will permit him to obtain flexibility which heretofore has been obtained only outside of the low limits which our process permits. It will also serve to more highly "refine" the higher grades of starting materials as desired, while conversely, it permits the use of lower grade starting materials and does not confine operations to the more expensive specialized pulps. In all cases a uniform product having predetermined characteristics can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a continuous method for the manufacture of alkali cellulose which may be used in the formation of viscose, the step which comprises treating a relatively small constant flow of cellulosic material with a properly proportioned constant impregnating flow of alkali hydroxide solution of mercerizing strength in such manner that only substantially the exact predetermined amount of solution required by the chemical net essential to accomplish mercerization is added to avoid the necessity of expressing or removing any excess of alkali solution, a substantially constant production of alkali cellulose being thus obtained.

2. In a method for the manufacture of alkali cellulose which may be used in the formation of viscose, the step which comprises treating a relatively small constant flow of somewhat impure cellulosic material with a properly proportioned constant flow of alkali metal hydroxide solution of mercerizing strength under pressure in amounts such that a constant limited excess of the alkali solution, after relatively instantaneous intimate impregnation of the cellulosic material has occurred, may be removed before aging together with the impurities suspended or dissolved therewith, a constant production of alkali cellulose being thus obtained.

3. In a method for the manufacture of alkali cellulose of approximately 29% cellulose content, the step which comprises continuously impacting and impregnating relatively finely divided cellulosic material with approximately $2\frac{1}{4}$ to $3\frac{1}{2}$ times its weight of alkali metal hydroxide solution of mercerizing strength under substantial pressure.

PAUL D. CLARY.
FRANKLIN T. GEORGESON.